C. P. THOMPSON.
WEED HOOK.
APPLICATION FILED FEB. 17, 1910.
956,653.
Patented May 3, 1910.
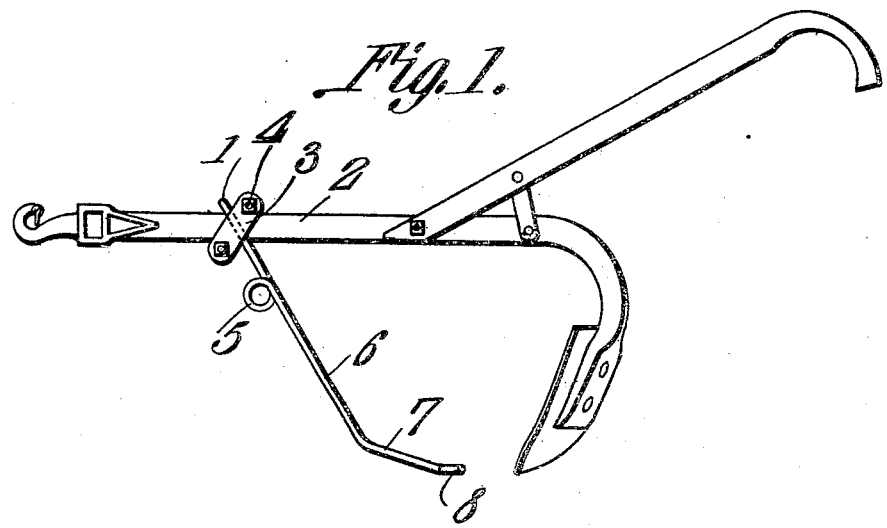
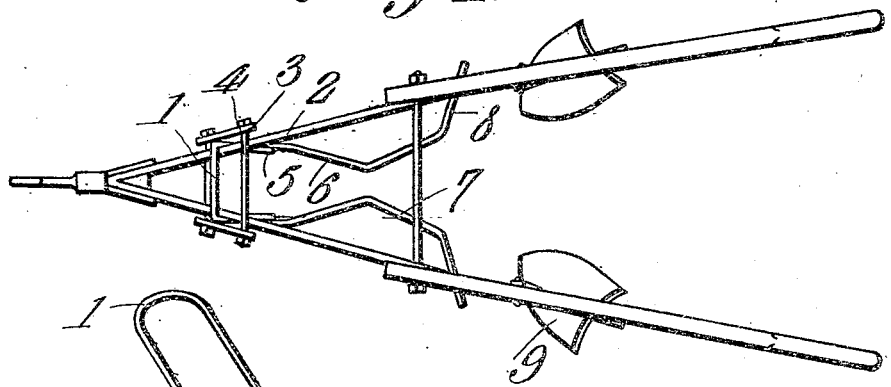
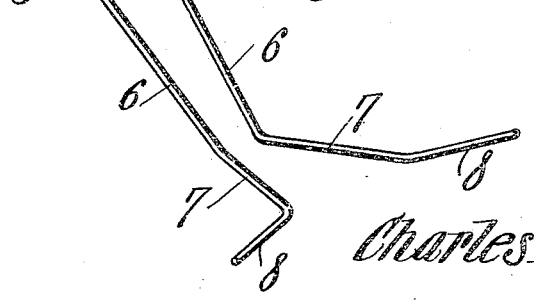
Inventor
Charles P. Thompson,

UNITED STATES PATENT OFFICE.

CHARLES P. THOMPSON, OF PATOKA, INDIANA.

WEED-HOOK.

956,653.

Specification of Letters Patent.

Patented May 3, 1910.

Application filed February 17, 1910. Serial No. 544,445.

*To all whom it may concern:*

Be it known that I, CHARLES P. THOMPSON, a citizen of the United States, residing at Patoka, in the county of Gibson and State of Indiana, have invented a new and useful Weed-Hook, of which the following is a specification.

This invention has relation to weed hooks designed especially to be applied to cultivators, and it consists in the novel construction and arrangement of its parts as hereinafter shown and described.

The object of the invention is to provide a simple and effective weed hook which is so shaped that it may be applied to the beam or frame of a cultivator and which is provided with resilient opposite portions adapted to bear against the weeds and force them into prostrate position in order that the cultivator shovels may cover the same with earth. The opposite side portions of the hook are adapted to operate upon the weeds which are growing in close proximity to the plants in the row.

In the accompanying drawing: Figure 1 is a side elevation of a cultivator with the hook applied thereto. Fig. 2 is a top plan view of the same. Fig. 3 is a perspective view of the hook detached.

In the preferred form the hook is made from a single resilient rod having the intermediate arch portion 1 adapted to straddle the beam or frame of a cultivator 2. Any suitable securing devices may be used for fixing the weed hook upon the cultivator and the securing device as illustrated consists of plates 3 applied to the sides of the frame of the cultivator 1 and connected together at their ends by means of draw bolts 4. Coils 5 are formed in the opposite side portions of the hook and below the said coils the opposite side portions converge slightly toward each other as at 6. The lower ends of the portions 6 merge into the diverging portions 7 which are pitched at an angle to the portions 6 and which at their rear ends merge into the approximately horizontal extremities 8. The extremities 8 are pitched at an angle to the portions 7 and diverge from each other toward their rear ends.

The weed hook is applied to the frame of the cultivator 1 in advance of the shovels 9 and as the cultivator is drawn along a row of plants the opposite side portions of the hook operate upon weeds growing in the soil at the opposite sides of the row and cut the said weeds down so that they may be covered by soil forced up by the shovels 9. Thus the weeds at the opposite sides of the row of plants are destroyed and the soil in the immediate vicinity of the roots of the plants constituting the crop is not disturbed. By reason of the fact that the lower ends of the portions 6 of the opposite sides of the hook converge toward each other they will at their said lower ends operate upon the weeds in close proximity to the plants while the space between the upper portions of the sections 6 of the opposite sides of the hook is sufficient to permit the foliage of the plants constituting the crop to pass through without injury.

By reason of the fact that the opposite side portions of the hook are provided with the coils 5 the structure possesses sufficient resiliency to hold the extremities 8 in close contact with the surface of the soil irrespective of irregularities that might occur.

Having described the invention what I claim as new and desire to secure by Letters-Patent is:

1. A weed hook having resilient opposite side portions spaced from each other, said portions having sections which converge toward each other at their rear end and are inclined downwardly, the opposite side portions having sections with which the first said sections merge, the last said sections diverging from each other at their rear end, the opposite side portions having extremities which diverge from each other at their rear ends, and with which the last said sections merge.

2. A weed hook formed from a single resilient rod having an arched intermediate portion and coils formed in its opposite side portions at the ends of the said arched portions, rearwardly and downwardly inclined sections with which the said coils merge, said sections having their rear ends converging toward each other, the opposite side portions of the hook having sections which diverge from each other at their rear ends and with the forward ends of which the first said sections merge, the opposite side portions of the hook having extremities which diverge from each other at their rear end and which are approximately horizontal and with the forward ends of which the rear ends of the last said sections merge.

3. A weed hook formed from a single resilient rod having an arched intermediate portion, the opposite side portions of said hook having coils with which the ends of the arched portion merge, the opposite side portions of the hook having its side sections which converge toward each other at their lower ends and with the upper ends of which the said coils merge, the opposite side portions of the hook having sections which diverge from each other at their rear ends and with the forward ends of which the said first sections merge, the last said sections being disposed at angles to the first said sections, the opposite side portions of the hook having extremities which diverge from each other at their rear ends and which are approximately horizontal and with the forward ends of which the rear ends of the last said sections merge, the said extremities being pitched at angles to the last said sections.

In testimony that I claim the foregoing as my own, I have hereto affixed my signature in the presence of two witnesses.

CHARLES P. THOMPSON.

Witnesses:
D. W. DUNCAN,
JOHN COOPER.